United States Patent
Koch et al.

(10) Patent No.: US 11,575,867 B2
(45) Date of Patent: *Feb. 7, 2023

(54) EVENT-TRIGGERED VIDEO CREATION WITH DATA AUGMENTATION

(71) Applicant: AT&T Intellectual Property I, L.P., Atlanta, GA (US)

(72) Inventors: Robert Koch, Peachtree Corners, GA (US); Ari Craine, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,318

(22) Filed: Jun. 11, 2021

(65) Prior Publication Data
US 2021/0306607 A1    Sep. 30, 2021

Related U.S. Application Data

(63) Continuation of application No. 16/710,682, filed on Dec. 11, 2019, now Pat. No. 11,064,175.

(51) Int. Cl.
| | | |
|---|---|---|
| H04N 9/87 | (2006.01) | |
| G11B 27/30 | (2006.01) | |
| G10L 25/57 | (2013.01) | |
| G11B 27/036 | (2006.01) | |
| G11B 27/11 | (2006.01) | |

(52) U.S. Cl.
CPC .......... *H04N 9/8715* (2013.01); *G10L 25/57* (2013.01); *G11B 27/036* (2013.01); *G11B 27/11* (2013.01); *G11B 27/30* (2013.01)

(58) Field of Classification Search
CPC .... H04N 9/8715; G10L 25/57; G11B 27/036; G11B 27/11; G11B 27/30
See application file for complete search history.

(56) References Cited

U.S. PATENT DOCUMENTS

| | | |
|---|---|---|
| 4,100,607 A | 7/1978 | Skinner |
| 6,249,280 B1 | 6/2001 | Garmon et al. |
| 6,317,141 B1 | 11/2001 | Pavley et al. |
| 6,654,031 B1 | 11/2003 | Ito et al. |
| 8,713,094 B2 | 4/2014 | Lisboa |
| 9,094,615 B2 | 7/2015 | Aman et al. |

(Continued)

FOREIGN PATENT DOCUMENTS

| | | |
|---|---|---|
| CN | 103916607 A | 7/2014 |
| CN | 107592506 A | 1/2018 |

(Continued)

OTHER PUBLICATIONS

Lee et al.; "User-Interface to a CCTV Video Search System"; IEEE Int'l Symposium on Imaging for Crime Detection and Prevention; 2005; p. 39-43.

(Continued)

*Primary Examiner* — Mishawn N. Hunter
(74) *Attorney, Agent, or Firm* — Guntin & Gust, PLC; Andrew Gust

(57) ABSTRACT

A method for creating a video that is generated based on the occurrence of pertinent events within a period of time. This video may be a summary video that includes video segments from multiple sources. The video may be augmented to display data describing pertinent events that occur.

17 Claims, 5 Drawing Sheets

(56) References Cited

U.S. PATENT DOCUMENTS

| | | |
|---|---|---|
| 9,911,045 B2 | 3/2018 | Bose et al. |
| 10,083,159 B1 | 9/2018 | Bekmambetov et al. |
| 10,237,615 B1 | 3/2019 | Gudmundsson et al. |
| 10,430,212 B1 | 10/2019 | Bekmambetov et al. |
| 2006/0177119 A1 | 8/2006 | McPheely et al. |
| 2006/0221184 A1 | 10/2006 | Vallone et al. |
| 2008/0303903 A1 | 12/2008 | Bentley et al. |
| 2009/0249428 A1 | 10/2009 | White et al. |
| 2013/0077699 A1 | 3/2013 | Gifford et al. |
| 2013/0177294 A1 | 7/2013 | Kennberg |
| 2014/0333776 A1 | 11/2014 | Dedeoglu et al. |
| 2014/0376872 A1 | 12/2014 | Lipetz |
| 2015/0317976 A1 | 11/2015 | Meagher |
| 2017/0186293 A1 | 6/2017 | Rabb |
| 2017/0316256 A1 | 11/2017 | Kim et al. |
| 2017/0374120 A1* | 12/2017 | Vishnia ............... H04L 65/607 |
| 2018/0255356 A1 | 9/2018 | Zhao |
| 2018/0330589 A1 | 11/2018 | Horling |
| 2019/0089934 A1 | 3/2019 | Goulden et al. |
| 2020/0013265 A1 | 1/2020 | Moloney |

FOREIGN PATENT DOCUMENTS

| | | |
|---|---|---|
| EP | 3269113 B1 | 6/2019 |
| FR | 3047596 A1 | 8/2017 |
| KR | 10-0656661 B1 | 12/2006 |
| KR | 2008-0093847 A | 10/2008 |
| KR | 2018-0010493 A | 1/2018 |
| RU | 2013135912 A | 2/2015 |
| WO | WO 1997/042601 A1 | 11/1997 |
| WO | WO 2017/208391 A1 | 12/2017 |
| WO | WO 2018/092016 A1 | 5/2018 |

OTHER PUBLICATIONS

Velastin et al.; "A distributed surveillance system for improving security in public transport networks"; Measurement & Control; vol. 35; Sep. 2002; p. 209-213.

Velastin et al.; "PRISMATICA: Toward Ambient Intelligence in Public Transport Environments"; IEEE Transactions on Systems, Man, and Cybernetics Part A: Systems and Humans; vol. 35; Jan. 2005; p. 164-182.

Castillo et al.; "A Review on Intelligent Monitoring and Activity Interpretation"; Inteligencia Artificial; vol. 20; 2017; p. 53-69.

Fan et al.; "Heterogeneous Information Fusion and Visualization for a Large-Scale Intelligent Video Surveillance System"; IEEE Transactions on Systems, Man, and Cybernetics: Systems; vol. 47; 2017; 12 pages.

Gokalp et al.; "Monitoring Activities of Daily Living of the Elderly and the Potential for Its Use in Telecare and Telehealth: A Review"; Telemedicine and e-Health; vol. 19; Dec. 2013; 14 pages.

* cited by examiner

EVENT-TRIGGERED VIDEO CREATION WITH DATA AUGMENTATION

CROSS REFERENCE TO RELATED APPLICATIONS

This application is a continuation of, and claims priority to, U.S. patent application Ser. No. 16/710,682, filed Dec. 11, 2019, entitled "Event-Triggered Video Creation With Data Augmentation," the entire contents of which are hereby incorporated herein by reference.

BACKGROUND

In a world of ever increasing smart devices and smarter technologies, the internet of things (IoT) proposes that everyday objects and devices (e.g., light bulbs, washing machines and cameras) are to have an internet connection, where these objects are enabled to send or receive data to and from other devices, thus forming a larger network of connected things (e.g., objects or devices). The IoT promises smarter homes and work environments where all the objects are seamlessly connected and controlled for easier and more convenient operation.

This disclosure is directed to addressing issues in the existing technology. This background information is provided to reveal information believed by the applicant to be of possible relevance. No admission is necessarily intended, nor should be construed, that any of the preceding information constitutes prior art.

SUMMARY

Disclosed herein are methods, systems, and apparatuses that may be used to create a video, in which the video is generated based on the occurrence of pertinent events within a period of time. This video may be a summary video that includes video segments from multiple sources. The video may be augmented to display data describing other pertinent events that occur during the same period of time.

In an example, an apparatus may include a processor and a memory coupled with the processor that effectuates operations. The operations may include obtaining video of a monitored location; obtaining information indicative of a device triggering event associated with a device, wherein the device is located in the monitored location; obtaining information indicative of a video triggering event associated with the video; based on the information indicative of the device triggering event or the video triggering event, determining descriptive event text for a first period associated with the video; and creating a first video segment associated with the descriptive event text for the first period based on the device triggering event or the video triggering event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein are methods, systems, and apparatuses that may be used to create a video, in which the video is generated based on the occurrence of pertinent events within a period of time. This video may be a summary video that includes video segments from multiple sources. The video may be augmented to display data describing other pertinent events that occur during the same period of time. Exemplary scenarios for event-triggered video creation with data augmentation are disclosed in more detail below, such a remote monitoring of a person in a senior living facility.

Figure 1:
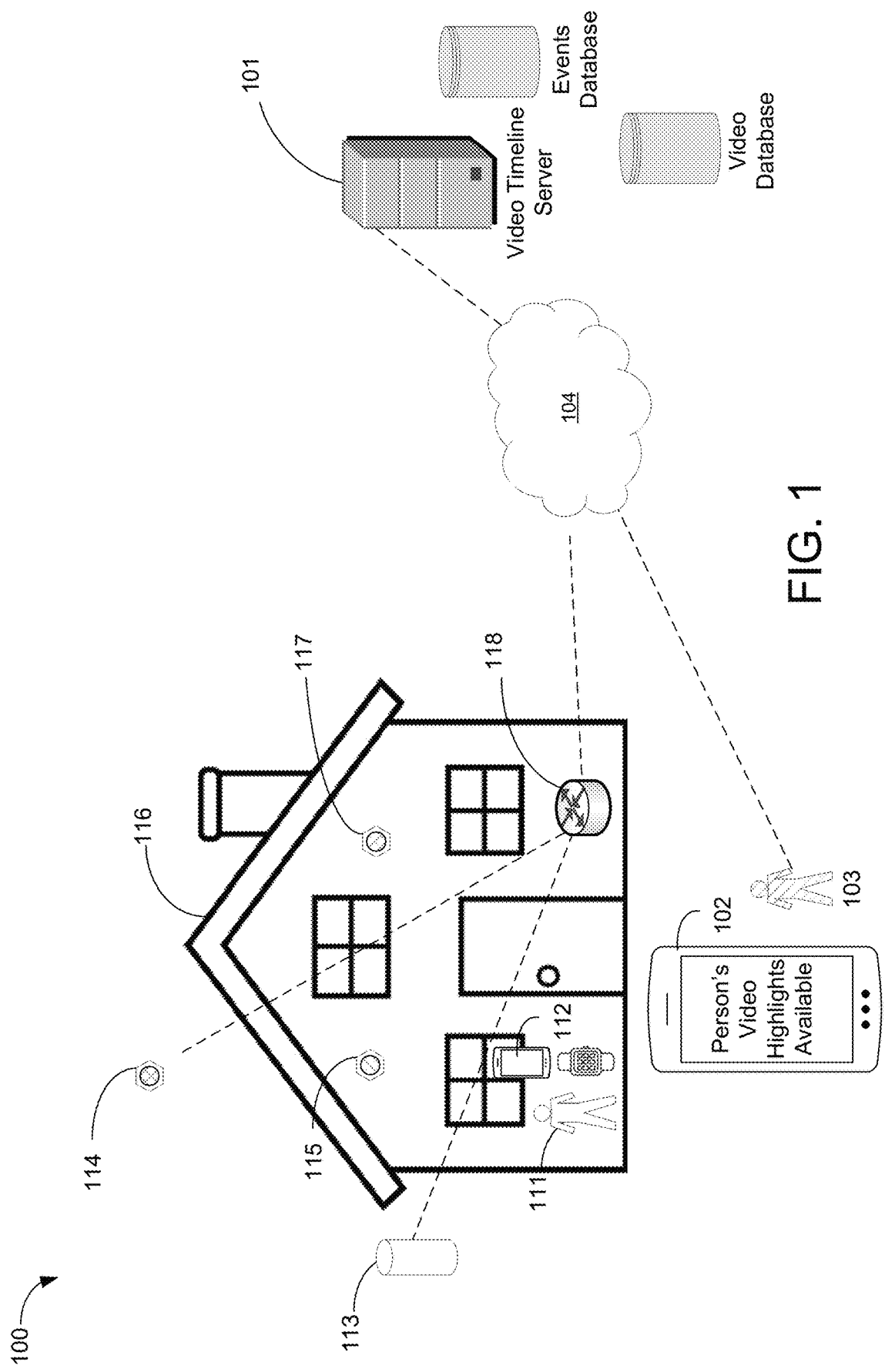
FIG. 1 illustrates an exemplary system associated with event-triggered video creation with data augmentation.

FIG. 1 illustrates an exemplary system associated with event-triggered video creation with data augmentation. System 100 may include multiple devices that may be remote from home 116 (e.g., a house), such as video timeline (VT) server 101 or mobile device 102 associated with user 103 (e.g., monitoring party 103), among other things. System 100 may include multiple devices that may be local to home 116, such as mobile device 112 associated with user 111 (e.g., monitored party 111), smart speaker 113, exterior sensor 114, interior sensor 115, router 118, or camera 117, among other things. Home 116, which may be considered a domain or monitored location, may include objects that are primarily not electronic, such as furniture. Domain may be narrowed to home-kitchen, home-bedroom-camera 117, or the like. The devices of system 100 may be communicatively connected with each other (e.g., via wireless or wired connections using network 104 or peer-to-peer (P2P) communication).

With continued reference to FIG. 1, in an example, VT server 101, mobile device 102, and the devices of home 116 may be communicatively connected with each other in order to obtain or provide information associated with monitored party 111, which may be a user of mobile device 112. VT server 101 may obtain information from any of the devices of system 100, which may be associated with home 116 or user of mobile device 112, to help manage the disclosed event-triggered video creation with data augmentation that is associated with home 116. Mobile device 112 may be used to monitor user 111 and gather or disseminate information such as user profile information, health information, user movement information, or the like. It is contemplated herein that the functions of the devices of system 100 may be combined into one device or distributed over multiple devices.

Mobile device 102 or mobile device 112 may include, wireless devices, such as satellite communication systems, portable digital assistants (PDAs), laptop computers, tablet devices, smart phones, smart watches, smart speakers, automobiles (e.g., autonomous vehicles), augmented reality devices, virtual reality devices, virtual assistants, or the like. Exterior sensor 114 or interior sensor 115 may include an environmental sensor, acoustic sensor, sound sensor, vibration sensor, fluid sensor, optical sensor, position sensor (e.g., accelerometer or gyroscope), speed sensor, chemical sensor, pressure sensor, camera, or the like.

Figure 2:
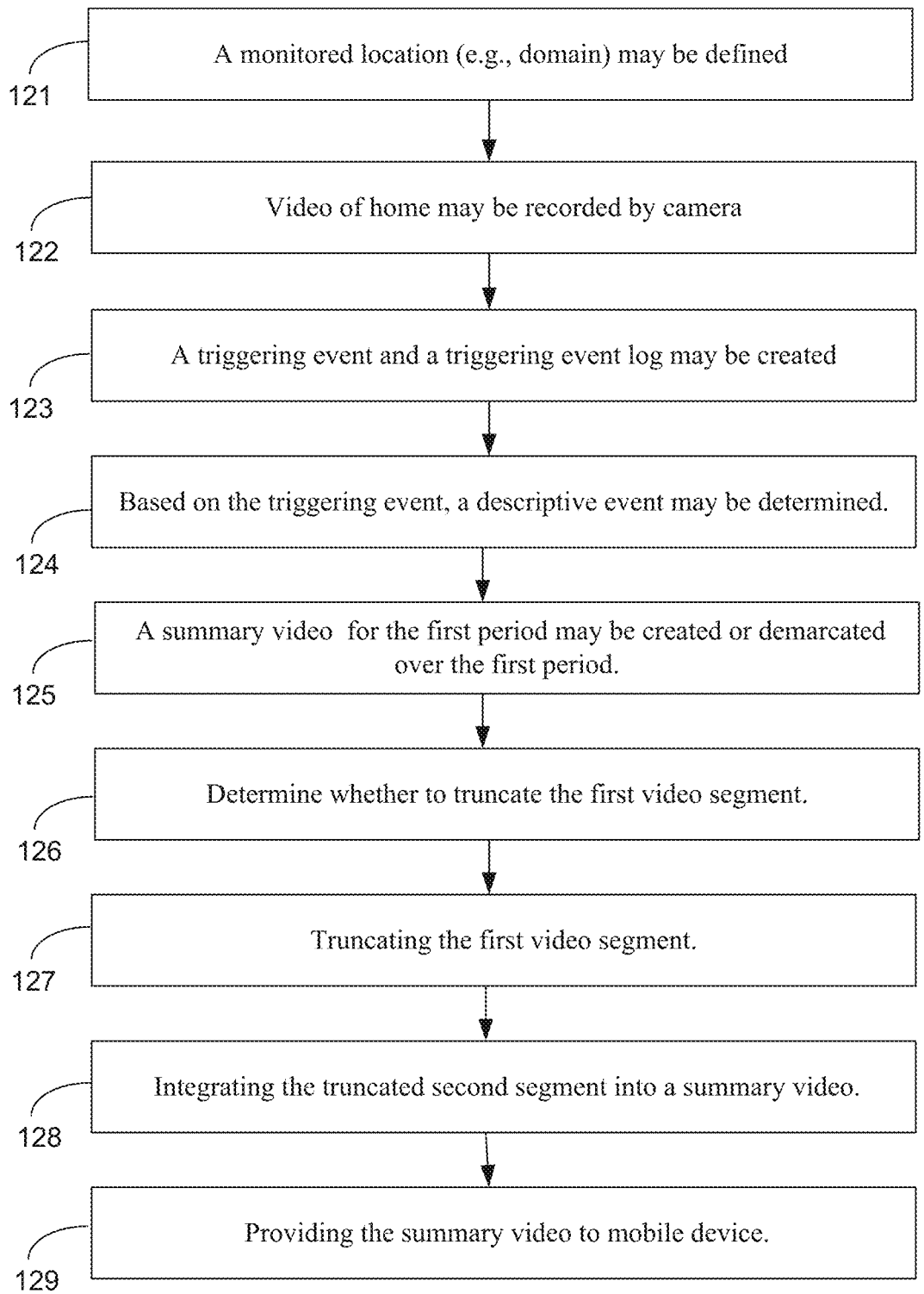
FIG. 2 illustrates an exemplary method associated with event-triggered video creation with data augmentation.

FIG. 2 illustrates an exemplary method associated with event-triggered video creation with data augmentation. At step 121, a monitored location (e.g., domain) may be defined, such as home 116. This may or may not include monitored party 111. In one scenario, monitored party 111 may be an elderly person living in home 116. Home 116 may include one or more devices that may detect events. This may include motion sensors, environmental sensors, microphones, health monitors, virtual assistants, doorbells, appliances, electronic pill boxes, environmental controls, cameras, home alarm systems, or smartphones, among other devices, all of which may be communicatively connected with router 118, each other, or network 104 (e.g., the Internet). If monitored part 111 is defined, monitored party 111 may be identified through facial recognition, voice recognition (e.g., when speaking to a smart speaker), or use of mobile device 112, among other things.

At step 122, video of home 116 may be recorded by camera 117. This video may be recorded based on a trigger (e.g., motion sensor) or camera 117 may continually record. The triggers disclosed herein may be associated with the use of one or more of the devices, e.g., motion, use of pill box, use of doorbell, a microphone that detects particular sounds or audible words (e.g., "help," a person's name, or smart speaker wake-up word), a particular decibel level of sound, or other sensors that detect predetermined conditions. In an example, in addition, triggers may be associated with a person's gait (e.g., detect change in gait), a person falling, or threshold inactivity of a detected person, among other things. The video may be obtained by VT server 101.

At step 123, a triggering event (device or video) may be detected and a triggering event log may be created. A device triggering event may be based on information obtained from one or more devices of system 100. A video triggering event may be based on information determined after analysis of the video. The triggering event may be the same as the triggers as disclosed in step 122. A triggering event may be a detected motion, a doorbell pressed or ringing, thermostat set, an object recognized (e.g., rectangular box at door), a package alert received (e.g., via SMS text or smart speaker), a face recognized (e.g., a person), or a door opened (e.g., detected via an alarm system sensor), among other things. These triggering events may be logged and obtained by VT server 101.

At step 124, based on the device triggering event or the video triggering event, descriptive event text may be determined. Descriptive event text may be considered a more detailed description of a period of time. The descriptive event text may be text displayed on or near a subsequently created video. VT server 101 may analyze triggering event logs and analyze video during a period to determine the descriptive event text. In a first example, the device triggering event logs during a first period may include an electronic calendar appointment for an in-home doctor's visit, a pressed doorbell, and a door opened and closed. In addition, the video triggering event logs during the first period may include an indication that a person that looks like a doctor or the audio from the video may indicate the word "doctor" was spoken. In this first example, VT server 101 may determine, based on the analyzed triggering event logs and the video during the first period, that a doctor visit occurred during the first period. VT server 101 may describe the first period of the video as "Doctor Visit" instead of or in addition to indicating a "doorbell rang" and "conversation was detected." It is contemplated that video from different cameras may be combined and synched for the first video segment. Using multiple triggering events in determining a descriptive event may increase the confidence level of the accuracy of the determined descriptive event text. The confidence level may be sent to mobile device 102 and there may be a threshold confidence that is required to be reached in order to create the video segment for the descriptive event text. It is also contemplated that a descriptive event image may be selected. For example, instead of the text "Doctor Visit" there may be an image (e.g., icon) of a stethoscope.

At step 125, a summary video of a descriptive event (e.g., "Doctor Visit"—first video segment) for the first period may be created or demarcated over the first period. This first video segment, as described in more detail below, may be part of a larger period that may be a summary of an extended time frame (e.g., events during a work day, an entire day, an entire week, etc.).

At step 126, VT server 101 may determine whether to truncate the first video segment. The first video segment may be truncated based on a predetermined set video segment length. For example, the first period may be 30 minutes and the predetermined set maximum video segment length may be 5 minutes. In this example, the first video segment should be truncated.

At step 127, based on a determination that the first video segment should be truncated, truncating the first video segment. There are multiple ways that the first video segment may be automatically truncated. In an example in which the segment length is reduced from 30 minutes to 5 minutes, the first and last 2 minutes and 30 seconds of the first video segment may be used to create a second video segment of 5 minutes total. In another example, short periods (e.g., 5 seconds or 30 seconds each) after or before discrete triggering events of the first video segment may be combined to create the truncated second segment. For example, the triggering events may be a pressed doorbell, door opening, door closing, entering a first room, entering a second room, or keywords spoken, among other things. The length of the "short periods" (sub-segments of the first video) may be based on the number of triggering events of the first video. For example, 10 triggering events with a maximum of a 100-second video may be calculated to ten 10-sec videos. In another example, the first video segment may be truncated based on inactivity. For example, there may be an observation of little to no movement and therefore redundant frames may be removed. Reduction in time of inactivity or other periods may be achieved by VT server 101 setting playback of a video segment (e.g. a sub-segment of the second video segment) to be at a faster speed. It is contemplated that any overlap in sub-segments may be addressed in a manner that there is little to no repeat of the same video.

At step 128, integrating the truncated second segment into a summary video of an extended time frame (e.g., highlight reel) for the morning or entire day, as described in more detail herein. At step 129, the entire summary video may be provided to monitoring party 103 via mobile device 102. Alternatively, the truncated second segment (or the first segment) may be provided to monitoring party 103 via mobile device 102, particularly when abnormal behavior or an emergency situation is detected. It is also contemplated herein that many of the steps of FIG. 2 may apply to the summary video.

Figure 3:
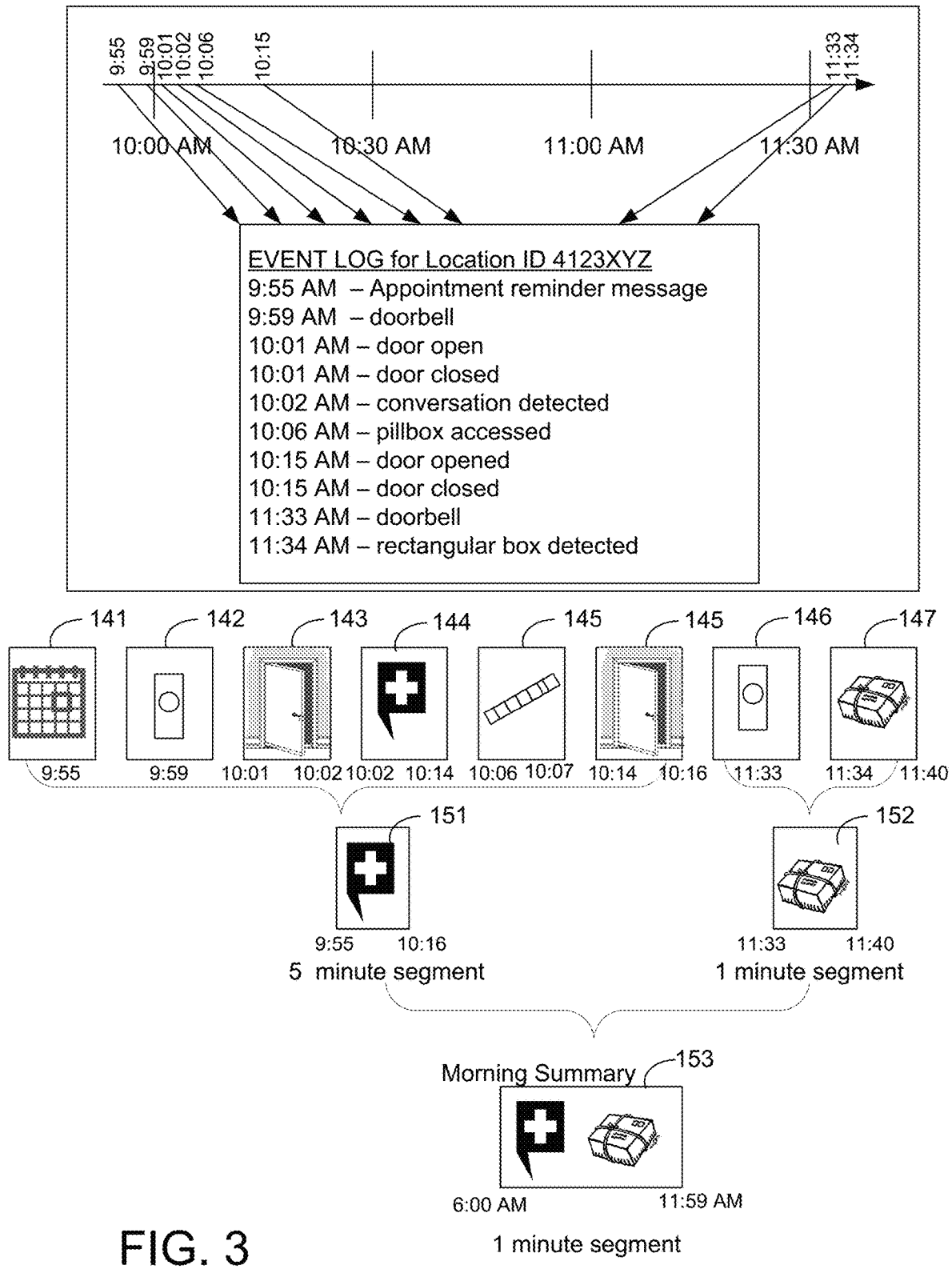
FIG. 3 illustrates an exemplary event-triggered video creation with data augmentation.

FIG. 3 illustrates an exemplary event-triggered video creation with data augmentation. As shown in FIG. 3, there are several events and associated videos that may be logged. Block 131 displays an exemplary timeline of triggering events that may be logged, such as pressed doorbell, door opening, or conversation detected. At or near the same time of the triggering events, video may be captured from one or more cameras. As shown, the video of block 141-block 147 may be associated with the triggering events on the timeline of block 131. Block 151 may be a descriptive event which includes a summary video of block 141-block 145 video that may be truncated based on predetermined information (e.g., descriptive event videos may only be 5 minutes long or less). Block 152 may be another descriptive event video of block 146 and block 147 and may be truncated (e.g., 1 minute) as well to remove inactivity. Block 151 and block 152, among other blocks (not shown) may be combined to create a summary video at block 153 that is sent to mobile device 102 (e.g., "morning summary video"), which may be 1 minute long in this example.

Below is additional perspective, details, and scenarios associated with event-triggered video creation with data augmentation. When triggering events are detected, an indication of the triggering event may be sent, indicating the type of event, and the time and date of the event, to an events database (e.g., VT server 101), where they are logged along with a location ID, which is a unique identifier of the monitored location (e.g., home 116). Camera 117 may also have built-in logic that triggers activation of recording and the creation of video segments when the video is analyzed for context by software resident on camera 117. For instance, camera 117 may monitor for the detection of changes in a person's gait, a fall, or inactivity.

Video segments may be recorded and sent to a video database (e.g., VT server 101). These video segments may include the time and date stamps and a description of the trigger that caused the creation of the segment. For example, the triggering event may be motion detected, inactivity detected, fall detected, trip detected, audio detected, or others. In an example, a virtual assistant (e.g., smart speaker 113) may listen for triggering sound types or spoken words, such as a scream or a spoken "help."

VT Server 101 may combine (e.g., concatenate) the pertinent video segments together into a single video stream (e.g., summary video). Within the stream, a box or other display may be used to indicate triggering events or descriptive events that occurred during the time of the video. The timestamps of the triggering events may be used to determine when to insert the event displays as an overlay on the video. For instance, if a doctor visit event occurred at 9:55 am, then an event alert may be displayed at the 9:55 am point within a 6:00 am-11:59 am video segment.

Some triggering events may occur at a time when no video was produced. In this case, a substitute video segment (e.g., a screen with a picture of a thermostat or text) may be inserted by VT server 101 in its creation of the summary video stream. This may be a short segment (e.g., 10 seconds) that permits time for the event text or still image to display. For instance, monitored party 111 may have set the thermostat to a low reading that is out of their comfort range. No video was triggered for the event, but the substitute video segment permits the event display. The result of the creation of the data augmented video stream (e.g., summary video) may be considered a "highlight" reel of the most pertinent video, augmented with time-synchronized event displays.

VT Server 101 may compress (as with regard to playback time or memory) some videos to permit the video stream to be shorter in duration. For instance, video segments that are triggered by inactivity detection may be compressed in time by removing redundant frames. In another example, inactivity video segments may be achieved by VT Server 101 setting playback for that segment to be at a faster speed (e.g., 2× or 10× playback speed).

Monitoring party 103 may be alerted of the availability of "highlight" reels via an alert sent to mobile device 102. Alternatively, monitoring party 103 may send a request to VT server 101 for playback. Some types of triggering events may be set to be "critical," in which a segment of the summary video is highlighted, a text indication of a possible emergency is provided, or some other alert to indicate to monitoring party 103 that the video should be reviewed as soon as possible. For instance, "critical" events (e.g., triggering events or descriptive events) may include missed pill dosage, garage door left open, pacemaker monitor alert, possible leg injury (e.g., based on same person different gait), incorrect pills taken (e.g., incorrect pill box opened), or abnormal blood flow (e.g., through smartwatch or transdermal optical imaging). Critical events may include trip detected, fall detected, and inactivity detected. Critical alerts may be noted on a listing of available highlight videos, which may be displayed on mobile device 102.

Figure 4:
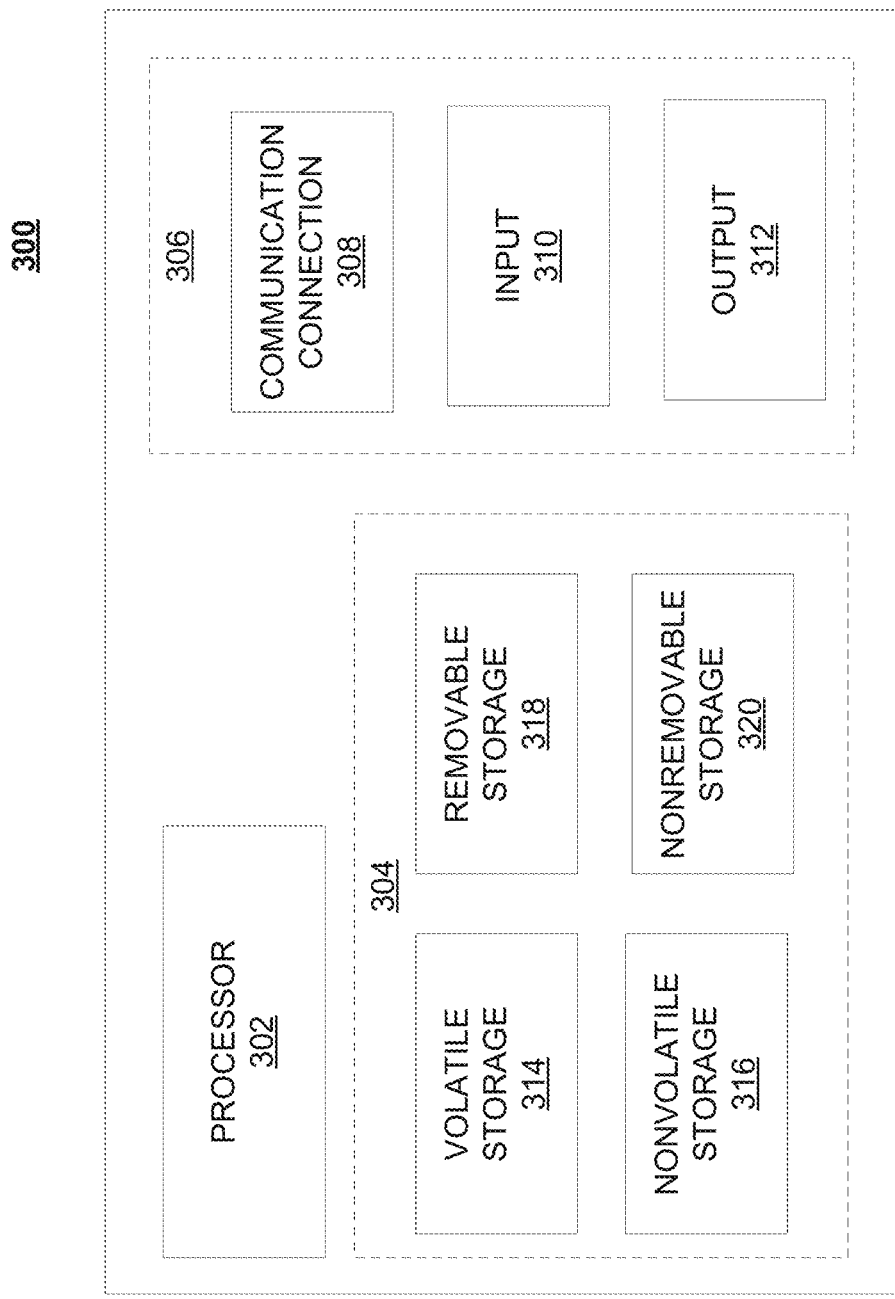
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
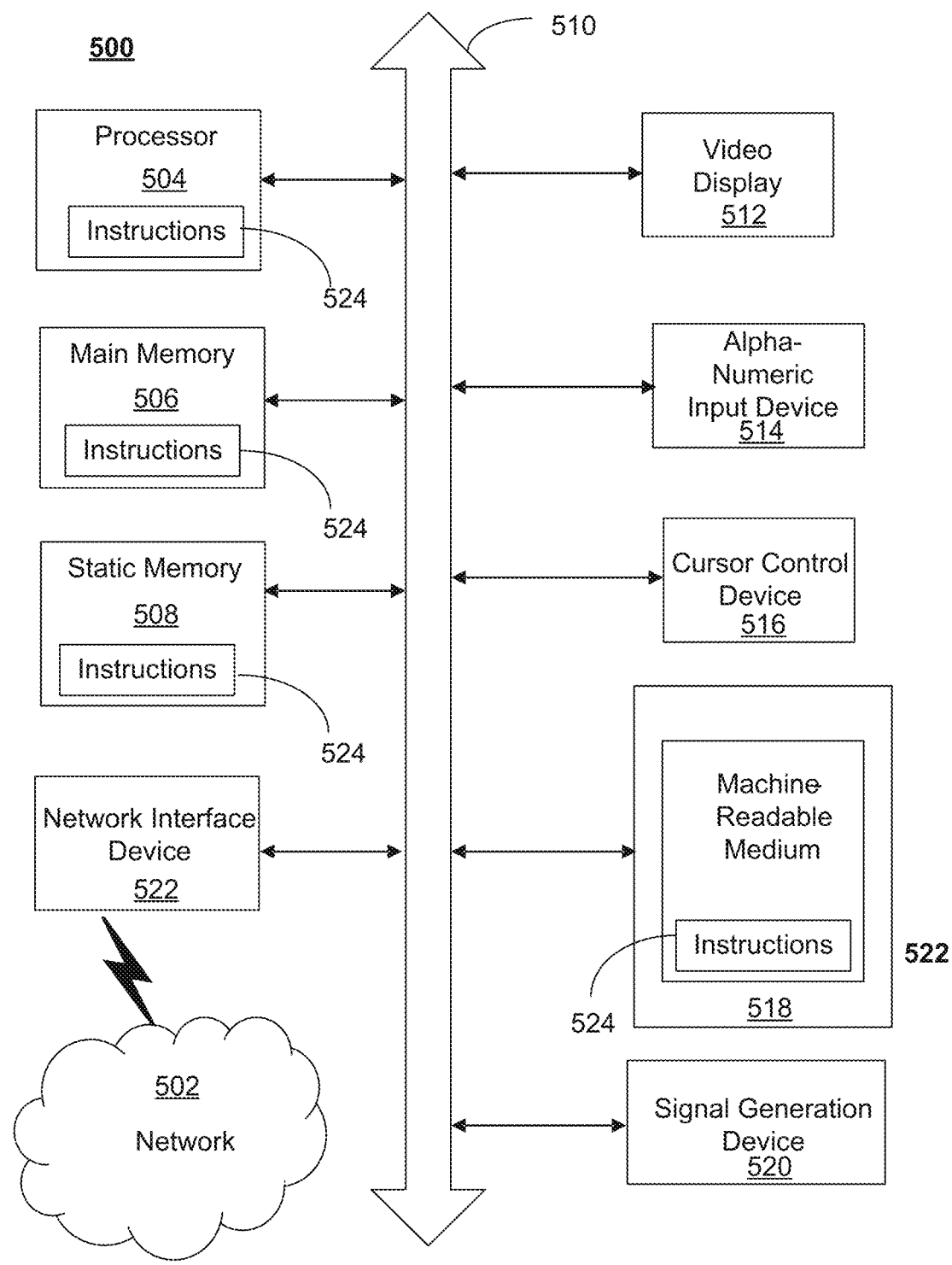
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, smart speaker 113, exterior sensor 114, interior sensor 115, router 118, or camera 117 and other devices of FIG. 1. It is contemplated that listed devices may be remote from or local to home 116 in certain situations. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which event-triggered video creation with data augmentation can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—event-triggered video creation with data augmentation—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for obtaining video of a monitored location; obtaining information indicative of a device triggering event associated with a device, wherein the device is located in the monitored location; obtaining information indicative of a video triggering event associated with the video; based on the information indicative of the device triggering event or the video triggering event, determining descriptive event text for a first period associated with the video; and creating a first video segment associated with the descriptive event text for the first period based on the device triggering event and the video triggering event. The method, system, computer readable storage medium, or apparatus may provide for based on the time length of the first video segment, preparing a truncated first video segment of the first video segment with the descriptive event text. The method, system, computer readable storage medium, or apparatus may provide for integrating the truncated first video segment into a summary video segment. The method, system, computer readable storage medium, or apparatus may provide for displaying an indication of the summary video segment to a mobile device. The device may include a mobile device or a smart speaker. The information indicative of the video triggering event or the device triggering event may include a threshold decibel level of a spoken word or other audio. All combinations in this paragraph (including the removal or addition of steps) are contemplated in a manner that is consistent with the other portions of the detailed description.

What is claimed:

1. An apparatus comprising:
   a processor; and
   a memory coupled with the processor, the memory storing executable instructions that when executed by the processor cause the processor to effectuate operations comprising:
   determining, based on information indicative of a device triggering event and a video triggering event, descriptive event text for a first period associated with a video;
   creating a first video segment of the video, wherein the first video segment is associated with the descriptive event text for the first period based on the device triggering event and the video triggering event;
   determining a time length of the first video segment;
   based on the time length of the first video segment, preparing a truncated first video segment of the first video segment with the descriptive event text; and integrating the truncated first video segment into a summary video segment.

2. The apparatus of claim 1, the operations further comprising setting playback of the summary video segment to be increased by at least a speed of 2-to-1.

3. The apparatus of claim 1, the operations further comprising displaying an indication of the summary video segment to a mobile device.

4. The apparatus of claim 1, wherein the device comprises a mobile device.

5. The apparatus of claim 1, wherein the device comprises a smart speaker.

6. The apparatus of claim 1, wherein the information indicative of the video triggering event or the device triggering event comprises a threshold decibel level of a spoken word.

7. A method comprising:
   determining, based on information indicative of a device triggering event and a video triggering event, descriptive event text for a first period associated with a video;
   creating a first video segment of the video, wherein the first video segment is associated with the descriptive event text for the first period based on the device triggering event and the video triggering event;
   determining a time length of the first video segment;
   based on the time length of the first video segment, preparing a truncated first video segment of the first video segment with the descriptive event text; and
   integrating the truncated first video segment into a summary video segment.

8. The method of claim 7, further comprising displaying an indication of the summary video segment to a mobile device.

9. The method of claim 7, wherein the device comprises a sensor.

10. The method of claim 7, wherein the device comprises a smart speaker.

11. The method of claim 7, wherein the information indicative of the video triggering event or the device triggering event comprises a threshold decibel level of a spoken word.

12. A system comprising:
   one or more processors; and
   memory coupled with the processors, the memory storing executable instructions that when executed by the one or more processors cause the one or more processors to effectuate operations comprising:
      determining, based on information indicative of a device triggering event and a video triggering event, descriptive event text for a first period associated with a video;
      creating a first video segment of the video, wherein the first video segment is associated with the descriptive event text for the first period based on the device triggering event and the video triggering event;
      determining a time length of the first video segment;
      based on the time length of the first video segment, preparing a truncated first video segment of the first video segment with the descriptive event text; and
      integrating the truncated first video segment into a summary video segment.

13. The system of claim 12, the operations further comprising setting playback of the summary video segment to be increased by at least a speed of 2-to-1.

14. The system of claim 12, the operations further comprising displaying an indication of the summary video segment to a mobile device.

15. The system of claim 12, wherein the device comprises a sensor.

16. The system of claim 12, wherein the device comprises a smart speaker.

17. The system of claim 12, wherein the information indicative of the video triggering event or the device triggering event comprises a threshold decibel level of a spoken word.

* * * * *